United States Patent [19]

Harding

[11] 4,367,880
[45] Jan. 11, 1983

[54] TRANSPORT DEVICE FOR WHEELLESS POWER DRIVEN EQUIPMENT

[75] Inventor: Edward M. Harding, Middletown, Md.

[73] Assignee: Equipment Development Company, Inc., Frederick, Md.

[21] Appl. No.: 146,246

[22] Filed: May 5, 1980

[51] Int. Cl.³ .............................................. B62B 1/12
[52] U.S. Cl. .............................. 280/47.13 R; 15/246; 280/43.1; 404/85
[58] Field of Search .................. 280/47.13 R, 47.13 B, 280/47.32, 35, 47.17, 47.24, 47.15, 767, 63, 43.1, 47.2; 15/79 R, 79 A, 49 R, 49 C, 49 RB, 246; 404/112, 85, 86; 51/177

[56] References Cited

U.S. PATENT DOCUMENTS

| 2,342,445 | 2/1944 | Allen | 404/112 |
| 2,394,274 | 2/1946 | Troxell | 404/112 |
| 2,639,572 | 5/1953 | Goeske | 280/47.13 R X |
| 2,730,320 | 1/1956 | Srader | 280/47.24 X |

Primary Examiner—Joseph F. Peters, Jr.
Assistant Examiner—Milton L. Smith
Attorney, Agent, or Firm—Birch, Stewart, Kolasch & Birch

[57] ABSTRACT

A detachable wheeled dolly device for separable connection to the base portion and the handle of relatively larger and heavy wheelless power driven handle manipulated machines, whereby a downward push on the handle tilts such machines from out of surface contact and facilitates transport of such machines from one location to another as required.

5 Claims, 4 Drawing Figures

TRANSPORT DEVICE FOR WHEELLESS POWER DRIVEN EQUIPMENT

BACKGROUND OF THE INVENTION

1. Field of the Invention

Generally this invention relates to a readily connectible and detachable dolly having wheels or roller means to permit the transport of wheelless power driven surface treating trowels, sanders, heavy power machines and the like.

2. Description of the Prior Art

The prior art has for many years been concerned with the problems attendant to the efficient and simple requirement to provide the maneuverability of heavy wheelless machines from one work location to another and to provide an auxiliary wheel device to facilitate transport of such machines to desired areas.

For example, prior patents have been issued for wheeled transport devices devised to selectably connect and disconnect from heavy equipment when deemed necessary to provide for transport thereof.

| U.S. Pat. No. 518,462 | Loomis | April 17, 1894 |
| U.S. Pat. No. 760,708 | Sharp | May 24, 1904 |
| U.S. Pat. No. 1,025,767 | Waterman | May 7, 1912 |
| U.S. Pat. No. 1,120,938 | Hazard | Dec. 15, 1914 |
| U.S. Pat. No. 2,089,336 | Brown | Aug. 10, 1937 |
| U.S. Pat. No. 2,439,581 | Robins | Apr. 13, 1948 |
| U.S. Pat. No. 2,479,421 | Sempe | Aug. 16, 1949 |
| U.S. Pat. No. 3,134,375 | Schurra | May 26, 1964 |
| U.S. Pat. No. 3,150,734 | Duggar, Jr. | Sept. 29, 1964 |
| U.S. Pat. No. 3,190,674 | Carter | June 22, 1965 |

However, the prior art has not provided a wheeled transport dolly formation adapted to be attached and adjustably mounted between the base and the maneuvering handle of a relatively heavy wheelless surface treating machine whereby the machine may be manually tilted from contact with a machine supporting surface when tilted by a downward manual push on the machine handle and be manually pushed around by the machine handle in a wheeled transport dolly fashion.

SUMMARY OF THE INVENTION

The main object of the present invention is the provision of a relatively small auxiliary wheeled transport dolly or the like formed to connect with the base and operating handle of a relatively heavy wheelless surface smoothing machine, whereby the rollers or wheels of the dolly will serve to permit rolling transport of the heavy machine to different locations.

Another object is to provide a miniature dolly attachment for transport of a handle maneuvered wheelless power driven machine, such as a surface smoother, sander and the like.

Yet another object is to provide a simple wheeled dolly adapted to be packaged and shipped disassembled in a knockdown state, to thereby be subsequently assembled and attached to many types of wheelless power operated surface treating machines to effect easy rolling movement of such machines when mounted and moved on the dolly rollers or wheels to different locations.

The foregoing and other objects and advantages of the present invention will appear more fully hereinafter from a consideration of the detailed description which follows, taken with the accompanying drawings wherein the invention is illustrated. It is to be understood, however, that the drawings are for the purpose of illustration only and are not intended as a definition of the limits or scope of the invention.

DETAILED DESCRIPTION OF THE INVENTION

Figure 1:
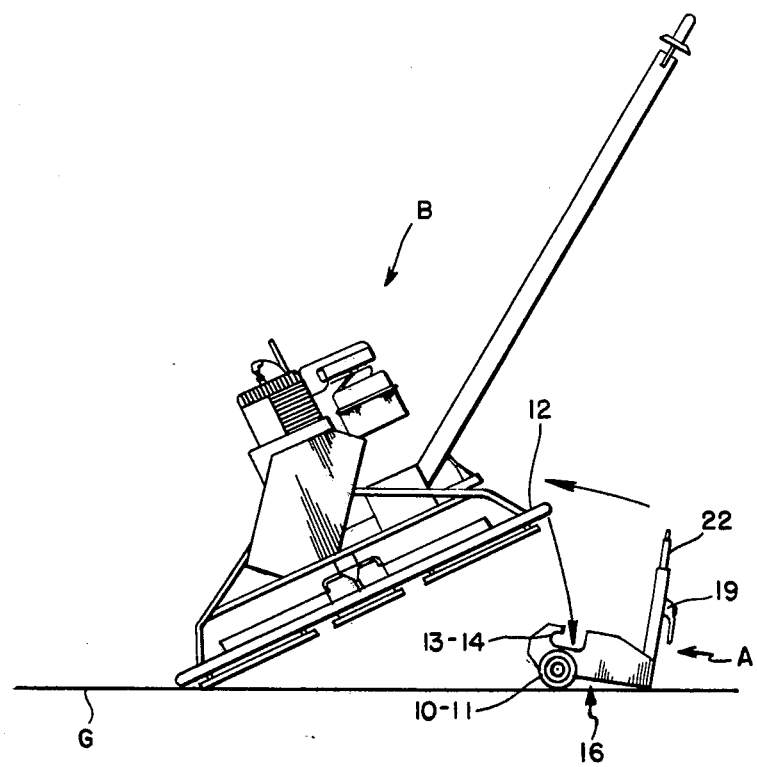
FIG. 1 is a side elevation view of a smoothing or sanding machine tilted forward to be connected by a base part of the machine to the forward spaced upper carrier hook portions of the dolly and subsequently into the cradling contact of the extensible dolly cradle with the operating handle of the machine.
Figure 2:
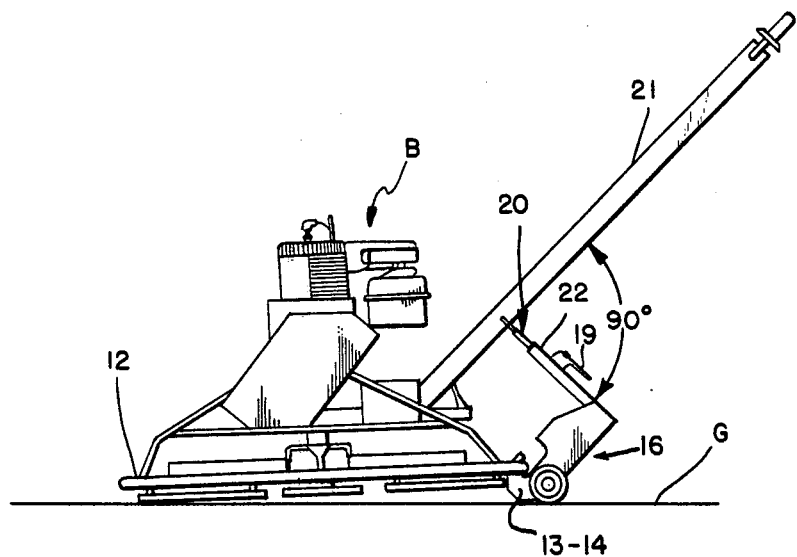
FIG. 2 shows the machine and transporter dolly in connected position with the dolly wheels resting on a flat surface to be treated by the machine and the dolly cradle in an adjusted angular position to permit the transporter dolly when pushed down by the machine handle to be tilted into dolly wheel transport position.
Figure 3:
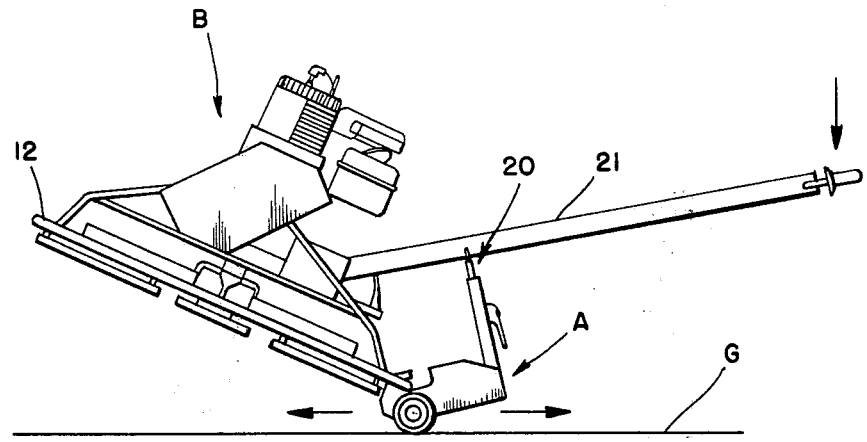
FIG. 3 shows the completed connection between the transporter dolly and the tilted machine for movement on the dolly wheels.

Referring in detail to the invention and first with reference to a wheeled transport dolly A as illustrated for use with a trowel smoother machine B in FIGS. 1, 2 and 3. The transport dolly A is shown in each instance with its wheels 10 and 11 in engagement with a ground surface G. The trowel machine B in FIG. 1 is shown tilted forward with a raised base flange or ring 12 thereof elevated above the upwardly curved spaced carrier connecting hooks 13 and 14 at each end of an angle iron plate in the forward transverse carrier end 16 of the transport dolly.

FIG. 2 shows the trowel machine tilted downward into mounting engagement with the transverse angle carrier plate 16 of the upstanding carrier end between the hooks 13 and 14. A handle cradle 20 of the transport dolly is adjusted into an extended latched connection by the lever nut 19, see FIG. 4, at an angle of approximately 90 degrees with respect to the handle 21 of the machine B. The transport dolly A permits manual tilting movement of the machine with respect to the ground surface G, see FIG. 3.

Figure 4:
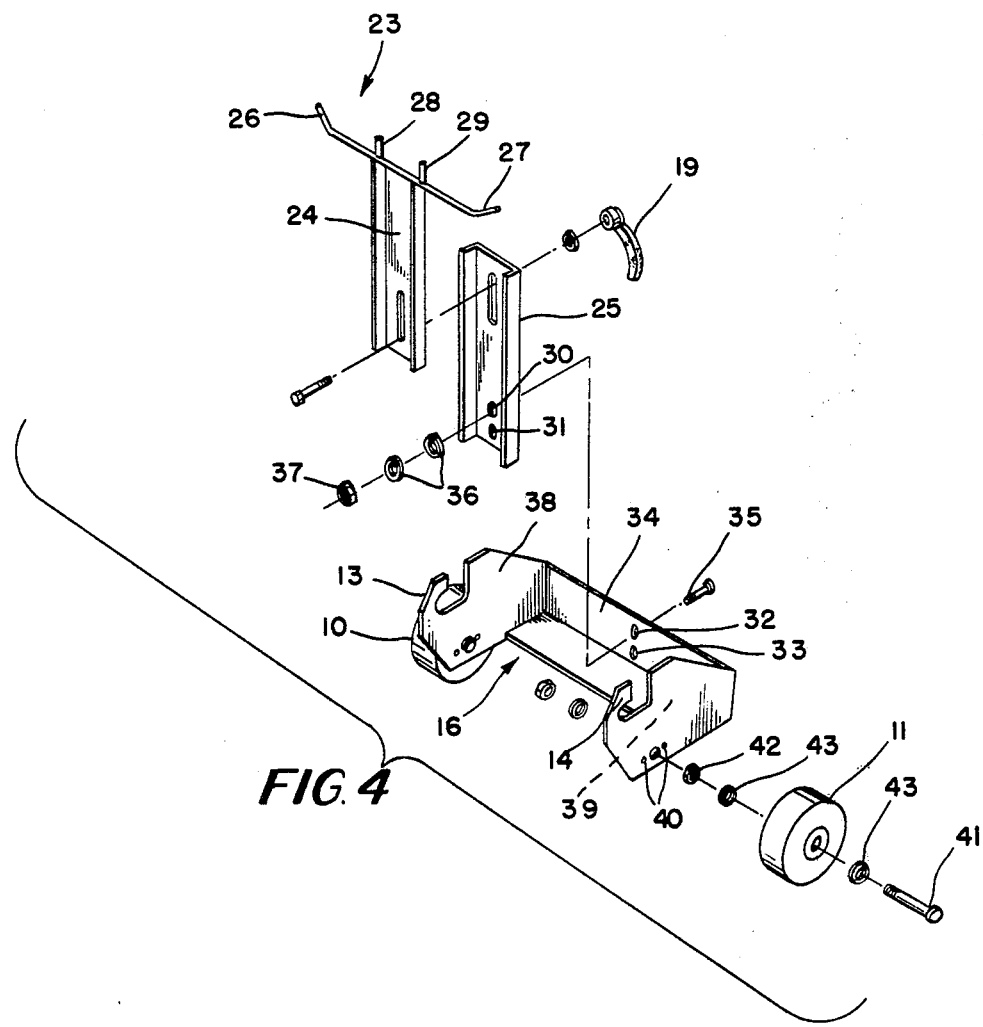
FIG. 4 is an exploded view of the several parts of the transporter dolly prior to final assembly when unpacked for subsequent use as shown in FIGS. 1, 2 and 3.

Now with reference in greater detail to the structural elements of the transport dolly A, the same is comprised of the pulled-apart array illustrated in FIG. 4 of the drawings. For example, the base of the dolly comprises the forward angle plate 16 formed with the spaced connector carrier hooks 13 and 14, and an extensible telescoping support formed from vertically slotted upper and lower mating plates 24 and 25. The upper plate 24 is formed transverse its top edge with a handle cradle portion 20, such as a bar 23 with upturned ends 26 and 27 and with spaced vertical upright lugs 28 and 29 equidistant from each upturned end, to thereby seat against the underside of the machine handle 21.

The lower plate 25 of the extensible telescoping cradle support is formed with vertically spaced fastener openings 30 and 31 for aligned registry with similarly spaced fastener openings 32 and 33 located medially of an upright angle portion 34 of the angle plate end 16, to thereby support the same when the fasteners such as bolts 35 are inserted and secured by washers 36 and nuts 37 in the said aligned fastener openings 32 and 33.

The interior spaced plane facing surfaces 38 and 39 of the upwardly spaced carrier connecting hooks 13 and 14 are each formed with horizontally and similarly spaced fastener openings 40 to provide for mounting of the respective rollers or wheels 10 and 11 of the transport dolly A. Such fastener openings receive the roller or wheel mounting bolts 41 and the bolts thread through the openings in the respective surfaces 38 and 39 and nuts 42 and washers 43.

Thus it may be readily understood how the arrangement of the above elements of the transport dolly A are associated together for use with the equipment B.

Without further description, it is believed that the advantages and cooperative novel operation of the present units is apparent and while only one arrangement is illustrated, it is to be expressly understood the same is not limited to only one arrangement as illustrated, as various arrangements may be made in the design and coactive arrangements of and between the devices, as will probably appear to those skilled in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dolly for transport service when attached to a base and an operating handle of a relatively large and heavy surface treating machine and detachably connectable between said base and said handle of the machine;
   said dolly including an upstanding cradle for engagement with said handle of the machine and being extendably, manually adjustable to regulate the angular position of said machine handle;
   said manually adjustable cradle including a locking lever to retain the cradle in an extended position to set said handle in a desired angular position with respect to a surface normally supporting said machine;
   whereby a manually applied downward push on said handle tilts said machine with respect to a base support surface to transpose the entire support of said machine from said surface to said dolly for manually maneuverable transport service.

2. A dolly for attachment to a base and an operating handle of a wheelless machine comprising:
   a plate member including spaced connector carrier hooks projecting outwardly therefrom and adapted to engage said base portion of said wheelless machine;
   an upwardly projecting adjustable cradle connected at one end to said plate member and including a second end adapted to engage said handle portion of said wheelless machine; and
   roller means operatively connected to said plate member and adapted to selectively rotatably support said wheelless machine;
   whereby said dolly is removably attachable to said base portion and said handle portion of said wheelless machine to pemit said wheelless machine to be conveniently transported by applying a downward force on said handle portion so that the weight of said wheelless machine is supported by said roller means.

3. A dolly according to claim 1 or 2, wherein said dolly is comprised of an assembly of separate parts arrangeable to be shipped from a point of manufacture in knocked-down condition to a point of assembly of said parts for subsequent connection to a suitable wheelless machine to provide the wheels for manual tilting of said machine and transport of the said machine from one location of use to another location.

4. A dolly according to claim 2, wherein said adjustable cradle includes a first member adjustably mounted relative to a second member, said first member being fixed to said plate member and said second member being extendable upwardly to substantially orthogonally engage said handle portion.

5. A dolly according to claim 2, wherein said roller means is a pair of wheels rotatably supported on said spaced connector carrier hooks.

* * * * *